Feb. 20, 1968  R. S. KIOUS  3,369,376
MELT WATER DISPOSAL SYSTEM FOR COLD DRINK VENDOR WITH ICE MAKER
Filed April 17, 1967  2 Sheets-Sheet 2

United States Patent Office 3,369,376
Patented Feb. 20, 1968

3,369,376
MELT WATER DISPOSAL SYSTEM FOR COLD DRINK VENDOR WITH ICE MAKER
Richard S. Kious, St. Ann, Mo., assignor to UMC Industries, Inc., St. Louis, Mo., a corporation of Delaware
Filed Apr. 17, 1967, Ser. No. 631,413
10 Claims. (Cl. 62—344)

ABSTRACT OF THE DISCLOSURE

A vendor for cold drinks with ice, having an ice maker for supplying ice to a hopper from which a quantity of ice is dispensed into a cup along with a drink, is provided with a system for disposing of water resulting from melting of ice in the hopper, which system is such as to avoid build-up of slime in the melt water.

Background of the invention

The invention relates to vendors for cold drinks, particularly carbonated beverages, of the type which have an ice maker supplying ice to an ice hopper, from which a quantity of ice is delivered into a cup along with a drink. A problem attendant upon such vendors has been the disposal of water resulting from melting of ice in the hopper, noting that it is impractical to dispose of such melt water to external sewage facilities or into a waste bucket in the vendor. Heretofore, it has been conventional practice to return melt water from the hopper to the ice maker, but, in this type of system, the melt water in the return tends to remain stagnant, a condition tending to promote the growth in the melt water return of certain slime-producing organisms. As a result, slime may build up in the return in highly undesirable quantity, even to the point of clogging the return.

Summary of the invention

The present invention solves the problem of internally disposing melt water from the ice hopper of a vendor for cold drinks with ice, without creating conditions favorable to build-up of slime, and, moreover, appears to tend to promote killing off of slime-producing organisms such as may exist in the melt water, so as to maintain the ice system of the vendor in sanitary condition free from clogging due to slime. It utilizes the carbonator such as is typically provided in the cold drink vendor for generating carbonated water for mixing of carbonated drinks, involving interconnection of the melt water drain of the ice hopper with the carbonator in such manner that, on delivery of tap water to the carbonator upon demand by the carbonator, melt water is positively drawn off from the ice hopper and all or at least part of the melt water is delivered to the carbonator. This avoids stagnation of melt water, thereby eliminating a condition favoring growth of slime in the melt water, and it is believed that it promotes killing of slime-producing organisms in the melt water, noting that there are indications that the carbonation of the water in the carbonator tends to kill such organisms. Other objects and features will be in part apparent and in part pointed out hereinafter.

Description of the preferred embodiment

Figure 1:
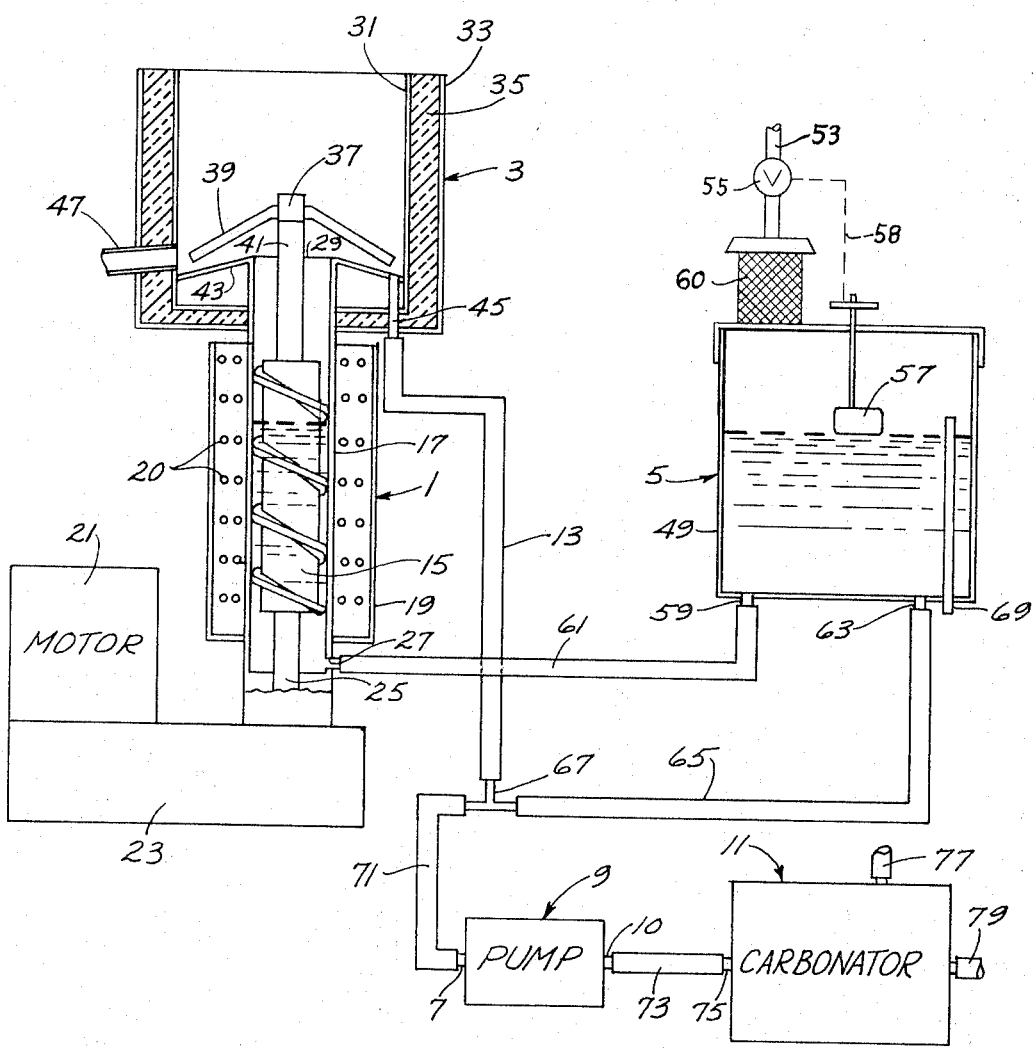
FIG. 1 is a diagrammatic view showing a melt water disposal system of the present invention.

Referring to FIG. 1, there is indicated at 1 an ice maker of a conventional type used in cold drink vendors for producing crushed ice for addition to vended drinks. Ice produced by the ice maker is fed to and stored in an ice hopper 3. Water is supplied from a float chamber 5 to the ice maker and to the inlet 7 of a pump 9, the outlet 10 of which is connected to a carbonator 11. A melt water line 13 is connected between the ice hopper 3 and the pump 9, the arrangement being such that melt water is forcibly withdrawn from line 13 each time the pump is operated to supply water to the carbonator.

More particularly, the ice maker 1 comprises a helical auger 15 disposed within a freeze chamber 17 of a vertically arranged freeze cylinder 19. The evaporator is provided with refrigerant coils 20 connected to a conventional refrigeration system (not shown). The auger 15 is driven by an electric motor 21 through a gear box 23 and a drive shaft 25. At the base of the freeze chamber 17 is a water inlet 27 and at the top is an ice outlet 29, the latter emptying into the hopper 3. The hopper is comprised of spaced inner and outer cylindrical walls 31 and 33 having an insulating material 35 therebetween. An agitator 37 having tines 39 is secured to a shaft 41 connected to the auger for rotation in the hopper 3 to stir the ice and maintain the particles separate. Mounted within the hopper at the top of the freeze chamber 17 is a downwardly inclined pan 43 for conveying the water resulting from melting of ice in the hopper to a melt water drain 45, the latter having the melt water line 13 connected thereto. An ice outlet 47 is provided in the side of the hopper 3 for discharging a quantity of ice via a chute (not shown) into a cup along with a drink.

The float chamber 5 is constituted by a tank or housing 49 having a tap water inlet 53 under the control of a valve 55 operated by a float 57, the valve being either electrically or mechanically operated through an interconnecting line or linkage indicated at 58. Tap water from inlet 53 and valve 55 passes through a conventional air break or anti-syphon device 60 and then empties into tank 49. Three water outlets are provided at the bottom of the chamber 5. The first outlet 59 is connected by a conduit 61 to the ice maker inlet 27, the second outlet 63 is connected by a conduit 65 to one end of a three-way T-fitting 67, and the third outlet 69, which constitutes an overflow conduit for the chamber 5, is connected by any suitable means to a waste bucket (not shown). The melt water line 13 is also connected to the T-fitting 67 along with a line 71 from the water pump 9. The pump may be any conventional type, such as a gear or screw pump. A line 73 interconnects the outlet 10 of the pump 9 with a tap water inlet 75 of the carbonator 11. The carbonator is also provided with an inlet 77 for carbon dioxide gas and a carbonator water outlet 79, the latter supplying carbonated water for mixing with syrups to produce carbonated drinks. It should be noted that the carbonator 11 and pump 9 operate intermittently to produce carbonated water on demand under the control of a carbonated water level sensor (not shown) for the carbonator.

The operation of the embodiment of the invention illustrated in FIG. 1 is as follows: The float chamber 5 maintains a head of water in the ice maker freeze chamber 17 through the interconnecting line 61. The water level is maintained constant in the chambers 5 and 17 by means of the float operated valve 55. That is, as the water in freeze chamber 17 is depleted by conversion into ice and removal by the auger 15 (or by operation of pump 9 on demand for water by the carbonator), the float 57 drops and the valve 55 admits tap water through water inlet 53 until the water level again reaches the desired depth, as detected by the float. Thus, the freeze chamber 17 is supplied with water through the line 61 and water inlet 27. As the water freezes into ice on the inside wall of freeze chamber of cylinder 19, the ice is augered up to the hopper 3 where it is stored. As the vendor is operated and beverage and ice dispensed, the carbonated water level control periodically senses a low carbonated water level and initiates operation of the carbonator 11 to produce additional carbonated water. Thus, the pump 9 is energized and water and carbon dioxide are admitted through inlets 75 and 77, respectively, to mix in the carbonator and produce carbonated water. When the pump is energized, water is drawn into the carbonator through the line 65, T-fitting 67 and lines 71 and 73. In addition, the melt water from hopper 3 is drawn from the melt water line 13 into the carbonator 11 each time the pump 9 is activated. Thus, the melt water line 13 is periodically exhausted of melt water by the suction of pump 9 acting through line 71 and fitting 67. This forcible removal of the water from the line 13 is sufficiently violent to prevent stagnation and the build-up of slime. Additionally, there are indications that slime-producing organisms in the melt water drawn into the carbonator tend to be killed by the carbonation.

Figure 2:
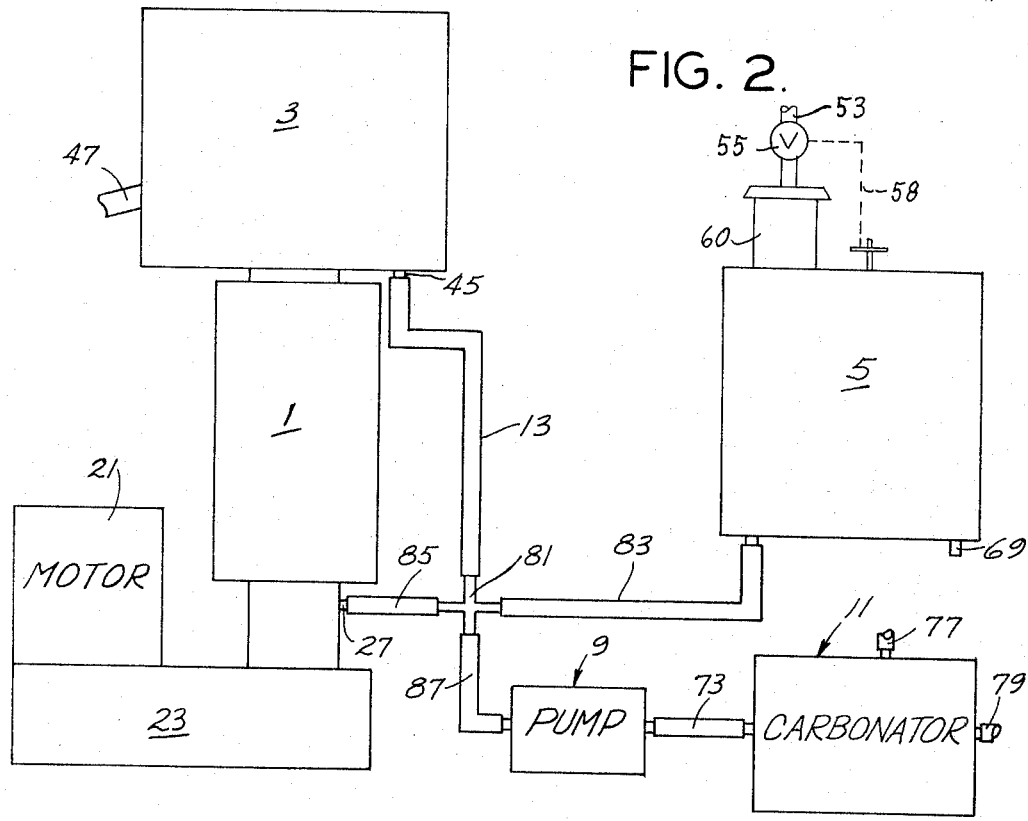
FIG. 2 is a view similar to FIG. 1 showing an alternative embodiment of the invention.
Figure 3:
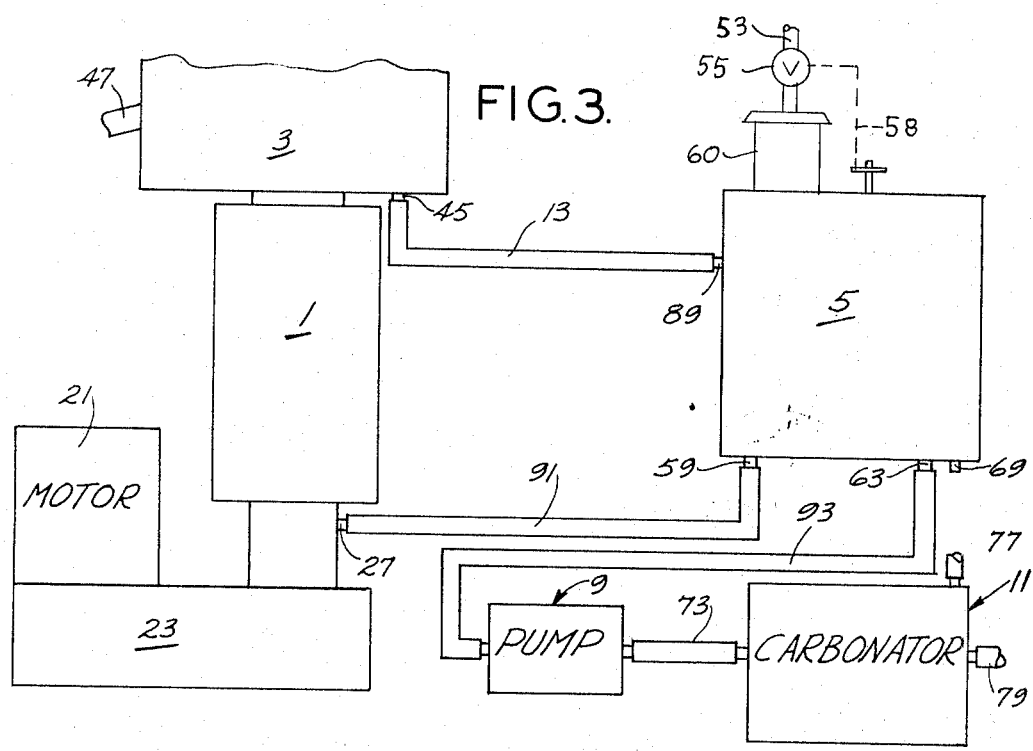
FIG. 3 is a view similar to FIG. 1 showing a second alternative embodiment of the invention.
Corresponding reference characters indicate corresponding parts throughout the several views of the drawings.

In the FIGS. 2 and 3 embodiments of the invention, only a portion of the melt water from the hopper is delivered to the carbonator, the remainder being returned to the ice maker. In FIG. 2, the ice maker 1, hopper 3, float chamber 5, pump 9 and carbonator 11 are substantially identical to that described above. However, a four-way fitting 81 is used to interconnect the melt water line 13 with a line 83 leading from the water outlet of the float chamber 5, a line 85 is connected to the water inlet 27 of the ice maker 1, and a line 87 is connected to the water pump 9. Thus, one of the water outlets of the float chamber 5 is eliminated and the water is supplied to both the ice maker 1 and carbonator pump 9 through the four-way fitting 81. In operation, water is supplied to the ice maker via lines 83 and 85 and to the carbonator pump via lines 83 and 87. The melt water line 13 is connected to the lines 85 and 87 through the four-way fitting 81. Therefore, a portion of the melt water is delivered to the ice maker through line 85 and a portion to the carbonator pump 9 through line 87. Thus, each time the carbonator pump 9 is operated to deliver tap water to the carbonator 11, the line 13 is exhausted and a portion of the melt water is drawn into the carbonator.

In the FIG. 3 embodiment, the melt water line 13 is connected to a melt water inlet 89 of the float chamber 5. The first water outlet of the chamber 5 is connected to the ice maker water inlet 27 by a line 91 and the second water outlet is connected to the carbonator pump by a line 93. Thus, the melt water from line 13 empties into chamber 5 where it is diluted with tap water and a portion delivered to the ice maker via line 91 and the remainder to the carbonator via line 93 and pump 9. Thus, although only a portion of the melt water is delivered to the carbonator, it is not allowed to accumulate in line 13 and become stagnant and promote the growth of slime.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:
1. In a cold drink vendor, an ice maker having a water inlet, an ice hopper connected to said ice maker for holding a quantity of ice produced thereby, said hopper having an ice outlet and a melt water drain, a carbonator for producing carbonated water, said carbonator having water and carbon dioxide inlets and a carbonated water outlet, means for delivering tap water to the carbonator water inlet, and means for interconnecting the melt water drain with the carbonator, whereby, on delivery of tap water to the carbonator, at least a portion of the melt water is drawn into the carbonator to prevent build-up of slime.

2. A vendor as in claim 1 wherein all of the melt water is drawn into the carbonator through said interconnecting means.

3. A vendor as in claim 1 wherein said interconnecting means comprises a line connected to the drain and to the carbonator.

4. A vendor as in claim 3 wherein said means for delivering tap water to the carbonator comprises a tap water source and a line interconnecting the source with the carbonator.

5. A vendor as in claim 4 further comprising a water pump in a line between the carbonator and the melt water drain and tap water source lines for respectively drawing melt water and tap water into the carbonator each time the pump is operated.

6. A vendor as in claim 1 wherein said means for delivering tap water comprises a water chamber having an inlet connected to a source of tap water, a first outlet having a line connected to the ice maker water inlet, and a second outlet having a line connected to the carbonator water inlet.

7. A vendor as in claim 6 wherein the interconnecting means comprises a line connected to the melt water drain and to the water chamber second outlet line.

8. A vendor as in claim 7 further comprising a water pump in a line between the carbonator and the drain and water chamber second outlet lines.

9. A vendor as in claim 6 wherein said interconnecting means comprises a line connecting the melt water drain to the water chamber, whereby the melt water is diluted with the tap water in the chamber and a portion is delivered to the ice maker through the first outlet and the remainder to the carbonator through the second outlet.

10. A vendor as in claim 1 wherein said means for delivering tap water comprises a water chamber having an inlet connected to a source of tap water, and an outlet connected to said melt water drain, said ice maker water inlet, and said carbonator water inlet, whereby a portion of said melt water is delivered to the ice maker and the remainder is drawn into the carbonator.

References Cited

UNITED STATES PATENTS 2,866,322    12/1958    Muffly _____ 62—348 X
3,196,628    7/1965    Reynolds _____ 62—354 X ROBERT A. O'LEARY, *Primary Examiner.*

W. E. WAYNER, *Assistant Examiner.*